UNITED STATES PATENT OFFICE.

CLIFFORD RICHARDSON, OF NEW YORK, N. Y., ASSIGNOR TO THE BARBER ASPHALT PAVING COMPANY, OF PHILADELPHIA, PENNSYLVANIA, A CORPORATION OF WEST VIRGINIA.

BITUMINOUS PAVING-CEMENT.

981,225.      Specification of Letters Patent.      Patented Jan. 10, 1911.

No Drawing.      Application filed September 19, 1908. Serial No. 453,784.

*To all whom it may concern:*

Be it known that I, CLIFFORD RICHARDSON, of New York city, in the county of New York and State of New York, have invented certain new and useful Improvements in Bituminous Paving-Cements, whereof the following is a specification.

Bituminous paving cements are ordinarily prepared by combining a native or artificial bitumen with a flux in the endeavor to produce a bituminous compound which shall have proper consistency for paving purposes at all atmospheric temperatures, that is to say, not too hard or brittle in cold weather and not too soft in hot weather. So far as possible non-volatile ingredients are employed to give the pavement permanence. But these bituminous cements as heretofore employed cannot be sucessfully combined with a mineral aggregate for the purpose of forming a paving material unless the aggregate is thoroughly heated, for the cement must first be heated to render it sufficiently fluid to mingle with the aggregate, and if the stone be then added cold the contact with the cold stone so decreases the fluidity as to render the mixing process difficult and imperfect. The great expense entailed in the manufacture of pavements by heating the aggregate makes it very desirable to produce a bituminous cement which will be proper for paving purposes and yet which can be combined with a cold aggregate.

To this end my invention consists of a bituminous cement which at atmospheric temperatures is permanently suitable for paving purposes, but which when heated to a temperature of say 250° becomes so fluid as to be capable of being properly mixed with a cold stone aggregate. This I secure by making the bituminous cement of the combination of a base and a medium, the former having the qualities heretofore regarded in the art as necessary in a paving cement, as shown by its physical properties, and the latter consisting of tar or oil of relatively small viscosity at temperatures in the neighborhood of 230 degrees Fahrenheit, such as petroleum distillates of 32 to 33 degrees Baumé, which are not volatile to any considerable extent at the temperature mentioned, and which remain under all circumstances a constituent of the paving cement, and which without interfering with its binding qualities at atmospheric temperatures impart to the base, the capacity of being rendered excessively fluid by a moderate degree of heat, for the purpose of coating satisfactorily, the cold mineral aggregate of the pavement.

The base consists of a native bitumen combined with an asphaltic flux in such a way as to produce a compound of great elasticity and small susceptibility to temperature. I find that such a base may be satisfactorily prepared by combining about 30 per cent. of Uintahite with about 70 per cent. of an extra heavy asphaltic flux of a specific gravity of .95 or over. The result of such combination is a compound exhibiting a consistency of from 50 to 100, as shown by the penetration in millimeters of a #2 cambric needle, weighted with a hundred grams, in five seconds, at a temperature of 77 degrees Fahrenheit.

The medium which is combined with the base consists of a light but nonvolatile flux, such as the petroleum in use for sprinkling roads, or tars from which the most volatile parts have been removed by distillation, or petroleum distillates of a gravity of about .86, but of slight volatility. This medium unites with the base and produces in combination with it a compound which is extremely liquid at temperatures above the boiling point of water, and possesses great spreading or coating power, although on cooling to ordinary atmospheric temperatures, the compound possesses sufficient viscosity to cement and bind the mineral aggregate, to prevent the formation of dust in dry weather upon the surface of the road, and to protect the latter from abrasion by motor driving, and to render it waterproof. For example, if petroleum oil of .86 gravity, is combined with a base, such as has been above described, in the proportion of about 25 per cent. of the medium to about 75 per cent. of the base, a compound is produced which becomes an extremely thin liquid when heated from 200 to 250 degrees Fahrenheit, exhibiting double the viscosity of water in an Engler viscosimeter.

Since the fluidifying medium is substantially non-volatile, and therefore remains in large part permanently incorporated with the asphaltic base, the latter must be so chosen as to permit its association with the medium with retention of the proper binding power at atmospheric temperatures. Accordingly the bituminous cement thus made and heated is sufficiently fluid and possesses the required spreading capacity, so as to be capable of being coated upon a mineral aggregate even though it is cold and contains the proper proportion of fine material to produce a stable aggregate. To effect this best the part of the aggregate which is of large sized stone, say #2 stone, is first combined with the hot cement and thoroughly mixed in a suitable mixer, and afterward the finer material to complete the graded aggregate is added.

The paving material thus prepared is laid in place and compressed in the usual way. It makes a road surface which is sufficiently stable to withstand displacement under travel, but is waterproof, and does not disintegrate with the formation of dust under motor traffic.

It will be understood that the materials and proportions may be largely varied from those which I have given, provided the principle is maintained of so combining the oily medium with the bituminous base as to secure the high fluidity and spreading power under moderate heat and the proper consistency for the paving cement under atmospheric temperatures.

In this specification I employ the term viscosity, in its proper sense of denoting resistance to flow.

Having thus described my invention, I claim:—

A bituminous paving cement, comprising a native bitumen; a heavy flux of a specific gravity of .95 or over, and a light flux, such as a petroleum oil of a specific gravity of about .86.

In testimony whereof, I have hereunto signed my name, at New York city this twelfth day of September 1908.

CLIFFORD RICHARDSON.

Witnesses:
C. T. BRYAN,
D. L. BRENNAN.